United States Patent
Delannoye

(10) Patent No.: US 10,300,892 B2
(45) Date of Patent: May 28, 2019

(54) METHOD TO SIGNAL THAT THE PARKING BRAKE OF AN AUTOMATIC OR AUTOMATED TRANSMISSION OF A VEHICLE IS NOT ENGAGED BEFORE THE DRIVER LEAVES THE VEHICLE

(71) Applicant: RENAULT s.a.s., Boulogne-Billancourt (FR)

(72) Inventor: Olivier Delannoye, Chatenay-Malabry (FR)

(73) Assignee: RENAULT s.a.s., Boulogne-Billiancourt (FR)

( * ) Notice: Subject to any disclaimer, the term of this patent is extended or adjusted under 35 U.S.C. 154(b) by 0 days.

(21) Appl. No.: 14/653,565

(22) PCT Filed: Oct. 15, 2013

(86) PCT No.: PCT/FR2013/052463
§ 371 (c)(1),
(2) Date: Jun. 18, 2015

(87) PCT Pub. No.: WO2014/096578
PCT Pub. Date: Jun. 26, 2014

(65) Prior Publication Data
US 2015/0336555 A1    Nov. 26, 2015

(30) Foreign Application Priority Data
Dec. 18, 2012    (FR) .................................. 12 62197

(51) Int. Cl.
*B60Q 1/00* (2006.01)
*B60T 1/00* (2006.01)
(Continued)

(52) U.S. Cl.
CPC .............. *B60T 1/005* (2013.01); *B60T 17/22* (2013.01); *G08B 21/24* (2013.01)

(58) Field of Classification Search
CPC .......... B60T 1/005; B60T 17/22; G08B 21/24
(Continued)

(56) References Cited

U.S. PATENT DOCUMENTS

| | | | | | |
|---|---|---|---|---|---|
| 4,482,885 A | * | 11/1984 | Mochida | ................ | B60K 28/00 200/61.88 |
| 4,495,484 A | * | 1/1985 | Kawakatsu | ............ | B60Q 9/001 200/61.64 |
| 5,015,991 A | * | 5/1991 | Barr | ...................... | B60Q 9/001 340/438 |

(Continued)

FOREIGN PATENT DOCUMENTS

| AU | 758 998 | 4/2003 |
|---|---|---|
| AU | 2003 200 668 | 9/2003 |

OTHER PUBLICATIONS

International Search Report dated Dec. 3, 2013 in PCT/FR2013/052463 Filed Oct. 15, 2013.
(Continued)

*Primary Examiner* — Kerri L McNally
*Assistant Examiner* — Thang D Tran
(74) *Attorney, Agent, or Firm* — Oblon, McClelland, Maier & Neustadt, L.L.P.

(57) ABSTRACT

A method to signal that a parking brake of an automatic or automated transmission of a motor vehicle is not engaged, during the detection that the driver or passenger door has been opened after the engine has been turned off, characterized in that a vehicle computing unit other than the transmission computer records the last signal related to the engaged state of the parking brake and triggers an alert signal conveyed to the passengers of the vehicle if the driver or passenger door is open and the parking device of the transmission is not engaged.

5 Claims, 1 Drawing Sheet

(51) Int. Cl.
  *G08B 21/24* (2006.01)
  *B60T 17/22* (2006.01)
(58) Field of Classification Search
  USPC .................................................. 340/457.3
  See application file for complete search history.

(56) References Cited

U.S. PATENT DOCUMENTS

| | | | | |
|---|---|---|---|---|
| 5,552,789 | A | * | 9/1996 | Schuermann ........ G07B 15/063 |
| | | | | 340/10.5 |
| 5,760,683 | A | * | 6/1998 | Barr ........................ E05B 77/54 |
| | | | | 200/61.88 |
| 6,246,313 | B1 | | 6/2001 | Baeker et al. |
| 6,300,868 | B1 | * | 10/2001 | Barr ........................ B60Q 9/001 |
| | | | | 340/438 |
| 6,406,102 | B1 | | 6/2002 | Arnold |
| 6,663,195 | B1 | | 12/2003 | Arnold |
| 2002/0189882 | A1 | | 12/2002 | Eberling |
| 2003/0060954 | A1 | * | 3/2003 | Kobata ..................... H04B 1/20 |
| | | | | 701/36 |
| 2003/0075981 | A1 | * | 4/2003 | Chen ....................... B60Q 9/001 |
| | | | | 307/10.1 |
| 2005/0221805 | A1 | * | 10/2005 | Koyano ............... G08G 1/0962 |
| | | | | 455/414.2 |
| 2006/0024646 | A1 | * | 2/2006 | Stahl ......................... G09B 9/04 |
| | | | | 434/62 |
| 2008/0224841 | A1 | * | 9/2008 | Lundgren ............... B60T 17/22 |
| | | | | 340/453 |
| 2008/0252438 | A1 | * | 10/2008 | Eguchi ..................... B60Q 9/00 |
| | | | | 340/456 |
| 2010/0207750 | A1 | * | 8/2010 | Fujisawa ................. G10L 13/00 |
| | | | | 340/438 |
| 2011/0193721 | A1 | * | 8/2011 | Koie ....................... B60R 25/00 |
| | | | | 340/901 |
| 2012/0078478 | A1 | * | 3/2012 | Spaulding ............ F16H 63/483 |
| | | | | 701/53 |

OTHER PUBLICATIONS

French Search Report dated Aug. 22, 2013 in French Application 1262197 Filed Dec. 18, 2012.

* cited by examiner

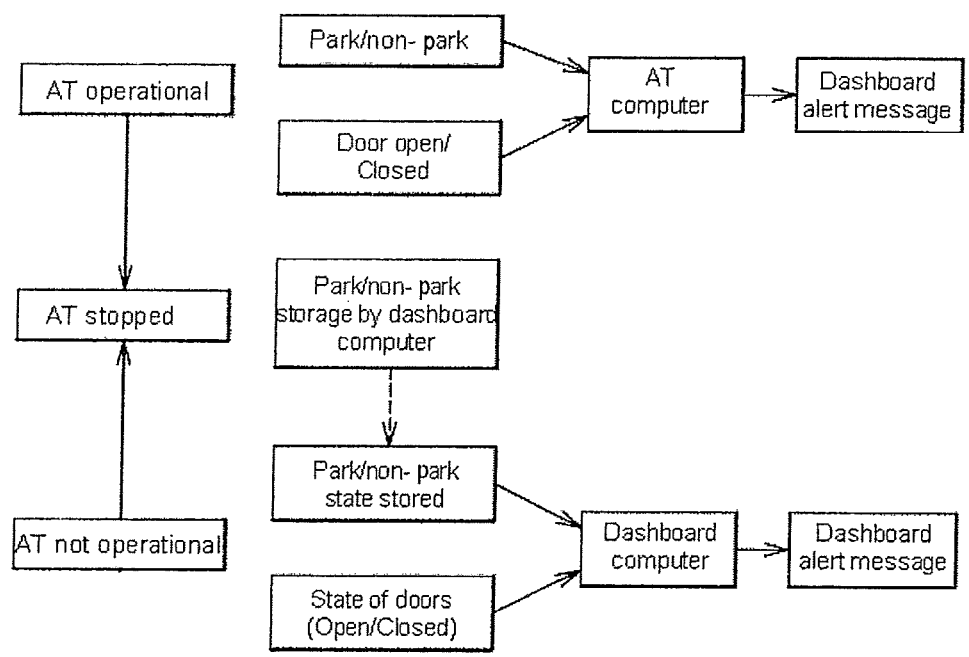

METHOD TO SIGNAL THAT THE PARKING BRAKE OF AN AUTOMATIC OR AUTOMATED TRANSMISSION OF A VEHICLE IS NOT ENGAGED BEFORE THE DRIVER LEAVES THE VEHICLE

The present invention relates to an alert strategy, called "open door alert", on vehicles equipped with automatic transmissions provided with an electrical parking finger function.

More specifically, its subject is a method for signaling that a parking brake associated with an automatic or automated motor vehicle transmission is not engaged, after the engine has been switched off.

This invention is especially, but not exclusively, applicable to vehicles equipped with automatic transmissions provided with an electrical parking finger.

In order to avoid any safety risk due to a non-immobilization of a vehicle with automatic, or automated, transmission, it is important to alert the driver to the fact that the transmission is not in "park" mode, before he or she leaves the vehicle.

According to one known arrangement, the alert is given by detecting the opening of the door of the driver, and by displaying a message on the dashboard. The publication U.S. Pat. No. 5,956,088 discloses a method of this type, combining the monitoring of the position of the selection lever of an automatic transmission and the activation of an alert signal.

The safety problem associated with the non-immobilization of the vehicle is not however resolved by this publication in all circumstances. In particular, if the automatic transmission computer which monitors the engagement of the parking brake is inactive when the vehicle is left, there is no more control as to the engagement of the parking brake.

The present invention aims to ensure the "door open alert" for the vehicle after the engine is switched off.

To this end, it proposes that a vehicle computation unit other than the transmission computer record the last signal relating to the state of engagement of the parking brake, and trigger an alert signal for the attention of the passengers of the vehicle, if the door of the driver or of the passenger is open although the parking device of the automatic or automated transmission is not engaged.

According to the invention, the storage of the engagement state signal is handled by a computer of the vehicle that remains active after the transmission computer has been switched off.

Preferably, the alert message is sent by a computer associated with the onboard controls of the vehicle.

Other features and advantages of the present invention will become clearly apparent on reading the following description of a nonlimiting embodiment thereof, with reference to the attached drawings, in which the single FIGURE illustrates the strategy.

The dashboard of a vehicle more often than not has its own computer, associated with the various onboard controls. The automatic transmission (AT) also has its own. In normal operation, that is to say when the automatic transmission (AT) is operational, "engine running", its computer is continually informed as to the state of engagement of the parking brake and/or the position of the speed selector. The computer of the AT can transmit to the dashboard the state of this particular function of the transmission over the data transmission network of the vehicle, for example its network or "CAN" (Controller Area Network) bus. The dashboard computer then has the possibility of reacting as "slave" "to order" of the computer of the AT, in an alert function, to warn the occupants of the vehicle as to the state of engagement, or non-engagement, of the parking brake. The "door open" alert can therefore be delivered in good time by an alert message from the dashboard.

Different computers can in principle ensure the detection of the opening of the door of the driver. However, for reasons of coherence, transversality and assignment of the functions to the various parts of the system, it is often the automatic transmission computer which itself manages this alert, as indicated in the top part of the FIGURE. In all circumstances, the "door open alert" function involves the monitoring of the door contacts and the processing of the "door open" information. In normal operation of the vehicle, the management of the alert therefore involves the computer of the AT. The alert is generated if the following two conditions are met: "door open" AND "park not engaged". The computer of the AT then generates the sending, over the CAN, of the message corresponding to the "door open" alert. The CAN message is used by the dashboard, or any other human-machine interface (HMI), in order to warn the occupants of the vehicle of the risk that is being run.

If, for electrical consumption optimization reasons, the automatic transmission is no longer powered after the engine is switched off, the transmission of the state of the parking brake over the CAN by the computer of the AT also stops. The "door open" alert is no longer generated, even if the parking finger is not engaged. The solution proposed to resolve this problem relies on the intervention of a computer which has not been used in computing the alert value. A computer other than the computer of the AT, and one which remains active after the latter is switched off, is therefore chosen. It is preferably the computer of the dashboard, which stores the last value of the message corresponding to the park/non-park state of the transmission in case of disappearance of the CAN message. Any other computation unit of the vehicle can also be made to contribute, if it is associated with a human-machine interface, the alert signal being preferably sent by a computer associated with the onboard controls of the vehicle.

As indicated in the central part of the diagram, as soon as the computer of the AT is no longer operational (in particular phases of life or because of failure), and the CAN message corresponding to the state of the transmission is no longer transmitted by the computer of the AT, the computer of the dashboard stores the last value of the message corresponding to the park/non-park state of the transmission.

If the computer of the dashboard also receives the state of the door of the driver, it can recompute, by itself, and reliably and coherently, the value of the "door open" alert which is "door open" AND "non-park".

Since the dashboard is permanently powered, there is thus an assurance that the "door open" alert will be generated in all the phases of life of the vehicle.

The invention is particularly applicable for the automated transmissions comprising an electrical parking finger actuator. In this case the position stored by the computer of the dashboard is always the final position of the automated transmission, since the parking finger is no longer powered: it is the position of the electrical parking finger, when its electrical power supply is switched off.

If the park position is controlled by a mechanical cable, this position can be engaged without electrical power supply. However, the park/non-park information of the transmission is stored. Consequently, if the dashboard stores a "park not engaged" position when the engine is switched off, the latter can be changed mechanically to "park not engaged" by a subsequent action of the driver on his or her speed selector, without the computer of the dashboard being informed thereof. This situation can possibly generate false alarms, but does not cause any risk of an uncontrolled movement of the vehicle, since the transmission is effectively immobilized.

The invention claimed is:

1. A method for providing an open door alert for a vehicle having an automatic transmission and an automatic transmission computer which reports a park/non-park state of the automatic transmission to a controller area network (CAN) of the vehicle, the method comprising when the automatic transmission computer is powered, repeatedly sending, from the automatic transmission computer, a signal relating to a current park/non-park state of the automatic transmission, to the vehicle CAN;

when the automatic transmission computer becomes unpowered, storing in a vehicle computation unit other than the automatic transmission computer the last signal relating to the park/non-park state that was sent from the automatic transmission computer to the CAN;

if the automatic transmission computer is powered, triggering said open door alert signal for the attention of the passengers of the vehicle if the door of the vehicle is open, and the signal on the CAN relating to the current park/non-park state indicates that the automatic transmission is in a non-park state; and if the automatic transmission computer is unpowered, triggering said open door alert signal for the attention of the passengers of the vehicle if the door of the vehicle is open, and the last signal, stored in the vehicle computation unit, relating to the park/non-park state indicates that the automatic transmission is in a non-park state.

2. The method as claimed in claim 1, wherein the vehicle computation unit that stores the last park/non-park state signal is a computer of the vehicle that remains active after the transmission computer has been switched off.

3. The method as claimed in claim 1, wherein the open door alert message is sent by a computer associated with the onboard controls of the vehicle.

4. The method as claimed in claim 1, wherein, if the CAN message disappears, the vehicle computation unit is a computer of the dashboard of the vehicle which stores the last value of the message corresponding to the park/non-park state of the transmission.

5. The method as claimed in claim 1, wherein a position of the automatic transmission stored by the computer of the dashboard is the position of an electrical parking finger, when electrical power supply of the electrical parking finger is switched off.

* * * * *